United States Patent Office 3,694,392
Patented Sept. 26, 1972

3,694,392
COATING COMPOSITIONS CONTAINING FLUORO-
CARBON POLYMER AND LITHIUM POLY-
SILICATE
Ervin R. Werner, Jr., Levittown, Pa., assignor to E. I. du
Pont de Nemours and Company, Wilmington, Del.
No Drawing. Continuation-in-part of application Ser. No.
778,828, Nov. 25, 1968. This application Dec. 22, 1970,
Ser. No. 100,766
Int. Cl. C08f 45/24
U.S. Cl. 260—29.6 F     14 Claims

ABSTRACT OF THE DISCLOSURE

A composition for priming a surface to improve the adhesion of a fluorocarbon polymer topcoat. The composition contains about 10–75% of lithium polysilicate, 25–90% of a flourocarbon polymer, and a liquid carrier.

CROSS-REFERENCE TO RELATED APPLICATIONS

This application is a continuation-in-part of application Ser. No. 778,828, filed Nov. 25, 1968, now abandoned.

BACKGROUND OF THE INVENTION

This invention relates to coating compositions. It is more particularly directed to primer compositions for improving the adhesion of fluorocarbon polymer coatings to their substrates.

In recent years, use of fluorocarbon polymers as lubricious coatings has become widespread. Cookware coated with polytetrafluoroethylene has become especially popular because of its non-stick character. The physical nature of these fluorocarbon polymers makes it difficult to bond them will enough to their substrates to prevent the coatings from peeling away or blistering during use. This is especially true of polytetrafluoroethylene.

SUMMARY OF THE INVENTION

I have found that adhesion of a fluorocarbon polymer coating to its substrate can be significantly improved if a composition of:

(a) particulate fluorocarbon polymer,
(b) lithium polysilicate, and
(c) a liquid carrier is used to prime the substrate before the fluorocarbon polymer topcoat is applied.

The lithium polysilicate I use in my compositions is an aqueous lithium polysilicate containing about 15% through about 35%, by weight, of silica as $SiO_2$. It has a $SiO_2/Li_2O$ mol ratio of about 4–25/1 and is free of alkali metals, other than lithium, to the extent that only those alkali metals which cannot be removed by ion-exchange are present.

The lithium polysilicate preferred for use in my compositions contains about 20% through about 25%, by weight, of silica as $SiO_2$ and has a $SiO_2/Li_2O$ mol ratio of 4–10/1.

Especially preferred is the lithium polysilicate which contains about 20% through about 25%, by weight, of silica as $SiO_2$ and has a $SiO_2/Li_2O$ mol ratio of 4–5.5/1.

The lithium polysilicate even more preferred contains about 20% through about 25%, by weight, of silica as $SiO_2$ and has a $SiO_2/Li_2O$ mol ratio of 8–9/1.

Methods for preparing the aqueous lithium polysilicates suitable for use in my compositions are described in U.S. Pat. No. 3,455, 709. The portions of that patent which describe preparation of lithium polysilicates are incorporated into this application by reference.

The lithium polysilicate is ordinarily present in my compositions in the form of an aqueous dispersion, at a solids concentration of about 10% through about 75%, by weight of the total of polysilicate and fluorocarbon polymer solids, preferably about 15% through about 40%. The especially preferred compositions contain about 25% of polysilicate.

The fluorocarbon polymers I use in my compositions are those of hydrocarbon monomers, preferably ethylenically unsaturated, completely substituted with fluorine atoms or a combination of fluorine atoms and chlorine atoms. Included in this group are polytetrafluoroethylene, copolymers of tetrafluoroethylene and hexafluoropropylene in all monomer unit ratios, and fluorochlorocarbon polymers such as polymonochlorotrifluoroethylene.

The fluorocarbon polymer I use is particulate. The particles should be small enough to pass through the nozzle of a spray gun without clogging it and small enough to give the resulting film integrity. In ordinary situations, the particle should be no larger than about 0.35 micron in the longest dimension.

Although I can use a dry flour or powder of fluorocarbon polymer and provide a liquid carrier separately, I prefer to use the polymer in the form of an aqueous dispersion because it is most easily obtained on the market in that form. Dispersions of fluorocarbon polymer in organic liquids miscible with water, such as ethanol, isopropanol, acetone and cellosolves, can also be used. In either case, the liquid also serves as a carrier for my composition.

The fluorocarbon polymer is ordinarily present in my compositions at a concentration of about 25% through about 90%, by weight of the total of polysilicate and fluorocarbon polymer solids, preferably about 60% through about 85%. The especially preferred compositions contain about 75% of fluorocarbon polymer.

My compositions are made by mixing proper amounts of an aqueous lithium polysilicate and a fluorocarbon polymer dispersion. The compositions can be pigmented by preparing a suitable pigment dispersion by conventional techniques and then simply adding this pigment dispersion to the composition. The total solids content of these compositions can be 35–45% by weight.

The resulting primer composition is applied in the usual way. If the surface to be coated is metal, it is preferably pretreated by grit-blasting, by the flame spraying of metals or metal oxides, by frit-coating the substrate, or by a combination of these methods.

After application, the primer coat is air-dried and then baked at 230–400° C. for 10 to 20 minutes.

This primer coat is then topcoated with a conventional clear or pigmented fluorocarbon polymer enamel, and baked in the usual way, to give an adherent fluoropolymer coating.

Although I get the best coatings with the two-coat system just described, I also get strongly adherent fluorocarbon polymer coatings with a one-coat operation. To do this, I apply a thicker coat of the primer composition, which may contain such pigments and surfactants as are necessary; this coat is then dried and baked as in the two-coat system. The advantage of this one-coat system in terms of labor cost is obvious.

My compositions are most useful for priming metal cookware, especially frypans, for coating with polytetrafluoroethylene, but they can also be used to prime other articles requiring fluorocarbon polymer films permanently bonded to their substrates. These articles can be made of glass or other materials that can withstand the baking temperatures used. For example, my compositions can be used to prime or coat bearings, valves, wire, metal foil, boilers, pipes, ship bottoms, oven liners, iron sole-plates, waffle irons, ice cube trays, snow shovels and plows, chutes, conveyors, dies, tools such as saws, files and drills, hoppers, and other industrial containers and molds.

DESCRIPTION OF THE PREFERRED EMBODIMENTS

Those skilled in this art will be able to practice my invention more easily by first referring to the following illustrative examples. In these examples, all parts are by weight.

EXAMPLE 1

A primer composition was prepared by thoroughly mixing:

| | Parts |
|---|---|
| Polytetrafluoroethylene dispersion, aqueous, particle size about 0.2 micron average (longest dimension) 60% solids | 375 |
| Lithium polysilicate 85 [1] | 375 |
| and Pigment dispersion | 30 |

The pigment dispersion was made by mixing:

| | |
|---|---|
| Water | 69.4 |
| Sodium polynaphthylene sulfonate | 0.5 |
| Red iron oxide | 5.3 |
| Carbon black | 0.7 |

[1] E. I. du Pont de Nemours and Company.

and then ball-milling the mixture for 16 hours.

An aluminum frypan was wiped with acetone to remove grease and then grit blasted. The pan was then cleaned of grit particles with a blast of compressed air and the primer composition sprayed on the pan to a thickness of 0.2–0.4 mil (dry).

The pan was then baked for 20 minutes at 230° C. after which it was topcoated with an enamel having the composition:

| | Parts |
|---|---|
| Polytetrafluoroethylene dispersion, aqueous, 50% solids | 99.5 |
| Sodium salt of the sulfuric acid ester of a mixture of long chain alcohols (predominantly lauryl alcohol) | 0.5 | by spraying the enamel over the primer to a thickness of 0.6–0.8 mil (dry) and then baking this at 400° C. for 20 minutes.

The resulting coating of polytetrafluoroethylene adhered well to the frypan, with no blistering or peeling after extended use in the kitchen.

EXAMPLE 2

A primer composition was prepared by thoroughly mixing:

| | Parts |
|---|---|
| Polytetrafluoroethylene dispersion, aqueous, particle size about 0.2 micron average (longest dimension) 60% solids | 375 |
| Lithium polysilicate 85 | 375 |
| Pigment dispersion | 65 |
| Sodium lauryl sulfonate | 7.5 |

The pigment dispersion was made as shown in Example 1.

An aluminum frypan was then treated and coated with this primer composition and topcoated, as shown in Example 1, to give a coating of polytetrafluoroethylene which adhered well to the frypan, with no blistering or peeling after extended use.

EXAMPLE 3

A primer composition was prepared by thoroughly mixing:

| | Parts |
|---|---|
| Polytetrafluoroethylene dispersion, aqueous, particle size about 0.2 micron average (longest dimension), 60% solids | 477 |
| Lithium polysilicate 85 | 477 |
| and Pigment dispersion | 83 |

The pigment dispersion was made by mixing:

| | Parts |
|---|---|
| Water | 67 |
| Sodium polynaphthylene sulfonate | 3 |
| Aluminum silicate | 10 |
| Carbon black | 20 | and then pebble-milling the mixture for 16 hours.

An aluminum fry pan was grit-blasted and fritcoated. The primer composition was sprayed on the pan to a thickness of 0.2–0.4 mil (dry). The pan was baked for 20 minutes at 230° C. and then topcoated, as shown in Example 1, to give a coating of polytetrafluoroethylene which adhered well to the fry pan, with no blistering or peeling after extended use.

I claim:
1. A composition consisting essentially of:
   (a) about 10% through about 75%, by weight of the total of (a) and (b) solids, of lithium polysilicate solids in the form of an aqueous dispersion, containing about 15% through about 35%, by weight, of silica as $SiO_2$, having a $SiO_2/LiO$ mol ratio of 4–25/1, and containing essentially no sodium or potassium ion which can be removed by ion exchange;
   (b) about 25 through 90%, by weight of the total of (a) and (b) solids, of a particulate polymer of an ethylenically unsaturated hydrocarbon monomer or monomers completely substituted with fluorine atoms or a combination of fluorine atoms and chlorine atoms, and
   (c) a liquid carrier.
2. The composition of claim 1 containing about 15% through about 40% by weight of the total of (a) and (b) solids of lithium polysilicate and about 60% through about 85% by weight of the total of (a) and (b) solids of a fluorocarbon polymer.
3. The composition of claim 1 containing about 25% by weight of the total of (a) and (b) solids of lithium polysilicate and about 75% by weight of the total of (a) and (b) solids of a fluorocarbon polymer.
4. The composition of claim 1 wherein the lithium polysilicate has a $SiO_2/Li_2O$ mol ratio of 4–10/1.
5. The composition of claim 2 wherein the lithium polysilicate has a $SiO_2/Li_2O$ mol ratio of 4–10/1.
6. The composition of claim 3 wherein the lithium polysilicate has a $SiO_2/Li_2O$ mol ratio of 4–10/1.
7. The composition of claim 1 wherein the lithium polysilicate has a $SiO_2/Li_2O$ mol ratio of 8–9/1.
8. The composition of claim 1 wherein the lithium polysilicate has a $SiO_2/Li_2O$ mol ratio of 8–9/1.
9. The compositions of claim 3 wherein the lithium polysilicate has a $SiO_2/Li_2O$ mol ratio of 8–9/1.
10. The composition of claim 1 wherein the fluorocarbon polymer is polytetrafluoroethylene.
11. The composition of claim 2 wherein the fluorocarbon polymer is polytetrafluoroethylene.
12. The composition of claim 3 wherein the fluorocarbon polymer is polytetrafluoroethylene.

13. The composition of claim 1 wherein the liquid carrier is water.

14. The composition of claim 9 wherein the fluorocarbon polymer is polytetrafluoroethylene and the liquid carrier is water.

References Cited

UNITED STATES PATENTS

| | | | |
|---|---|---|---|
| 2,710,266 | 6/1955 | Hochberg | 260—29.6 F |
| 2,825,664 | 3/1958 | Huntsberger | 260—29.6 F |
| 3,455,709 | 7/1969 | Sears | 106—84 |
| 2,592,147 | 4/1952 | Ikeda | 260—29.6 F |

FOREIGN PATENTS

| | | | |
|---|---|---|---|
| 587,496 | 11/1959 | Canada | 260—29.6 F |

HAROLD D. ANDERSON, Primary Examiner

U.S. Cl. X.R.

260—32.8 R, 33.2 R, 33.4 F